(12) United States Patent
Oono et al.

(10) Patent No.: US 10,297,244 B2
(45) Date of Patent: May 21, 2019

(54) CARBON-BASED ACOUSTIC MATCHING LAYER AND METHOD FOR PRODUCING SAME

(71) Applicant: MITSUBISHI PENCIL COMPANY, LIMITED, Tokyo (JP)

(72) Inventors: Toshiki Oono, Fujioka (JP); Atsunori Satake, Fujioka (JP); Takeshi Suzuki, Fujioka (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 222 days.

(21) Appl. No.: 15/319,523

(22) PCT Filed: Jun. 17, 2015

(86) PCT No.: PCT/JP2015/067506
§ 371 (c)(1),
(2) Date: Dec. 16, 2016

(87) PCT Pub. No.: WO2015/194602
PCT Pub. Date: Dec. 23, 2015

(65) Prior Publication Data
US 2017/0125005 A1 May 4, 2017

(30) Foreign Application Priority Data
Jun. 18, 2014 (JP) .................................. 2014-125536

(51) Int. Cl.
*G10K 11/00* (2006.01)
*G10K 11/168* (2006.01)
(Continued)

(52) U.S. Cl.
CPC .............. *G10K 11/168* (2013.01); *B32B 7/02* (2013.01); *B32B 9/007* (2013.01); *B32B 9/04* (2013.01);
(Continued)

(58) Field of Classification Search
None
See application file for complete search history.

(56) References Cited

U.S. PATENT DOCUMENTS

2003/0231549 A1  12/2003  Shiraishi et al.
2007/0108872 A1   5/2007  Shibamoto et al.
(Continued)

FOREIGN PATENT DOCUMENTS

JP    2002-135895 A    5/2002
JP    2004-45389 A     2/2004
(Continued)

OTHER PUBLICATIONS

International Search Report dated Jul. 28, 2015, issued in counterpart application No. PCT/JP2015/067506. (1 page).
(Continued)

*Primary Examiner* — Hovhannes Baghdasaryan
(74) *Attorney, Agent, or Firm* — Westerman, Hattori, Daniels & Adrian, LLP

(57) ABSTRACT

Provided are: a carbonaceous acoustic matching layer which exhibits satisfactory mechanical strength, in which losses at a layer interface are suppressed as far as possible and in which the degree of variation in acoustic impedance in the thickness direction can be increased; and a method for producing same. The carbonaceous acoustic matching layer is obtained by dispersing filler particles, which are selected on the basis of the desired acoustic impedance of each layer, in a resin such as a furan resin, a phenol resin or a vinyl chloride resin, curing, laminating, and then carbonizing the resin by heating in a non-oxidizing atmosphere, amorphous carbon, which is obtained by the resin carbonization, is integrated across all the layers. The blending proportion of the filler particles is decided so that the difference in
(Continued)

coefficient of linear contraction caused by the carbonization is at a minimum between adjacent layers.

11 Claims, 1 Drawing Sheet

(51) Int. Cl.
  *H04R 17/00*  (2006.01)
  *H04R 31/00*  (2006.01)
  *B32B 7/02*  (2019.01)
  *B32B 9/00*  (2006.01)
  *B32B 9/04*  (2006.01)
  *G10K 11/02*  (2006.01)
  *G10K 11/04*  (2006.01)

(52) U.S. Cl.
  CPC ............ *G10K 11/02* (2013.01); *H04R 17/00* (2013.01); *H04R 31/00* (2013.01); *B32B 2307/102* (2013.01); *G10K 11/04* (2013.01)

(56) References Cited

U.S. PATENT DOCUMENTS

2012/0186002 A1\* 7/2012 Bhatnagar .............. A42B 3/063
                     2/412
2013/0221805 A1  8/2013  Ogura et al.

FOREIGN PATENT DOCUMENTS

| JP | 2007-129554 A | 5/2007 |
|---|---|---|
| JP | 2013-236262 A | 11/2013 |
| JP | 2015-82764 A | 4/2015 |
| WO | 2012/144226 A1 | 10/2012 |

OTHER PUBLICATIONS

Extended (supplementary) European Search Report dated Jan. 19, 2018, issued in counterpart European Application No. 15810184.0. (6 pages).

\* cited by examiner

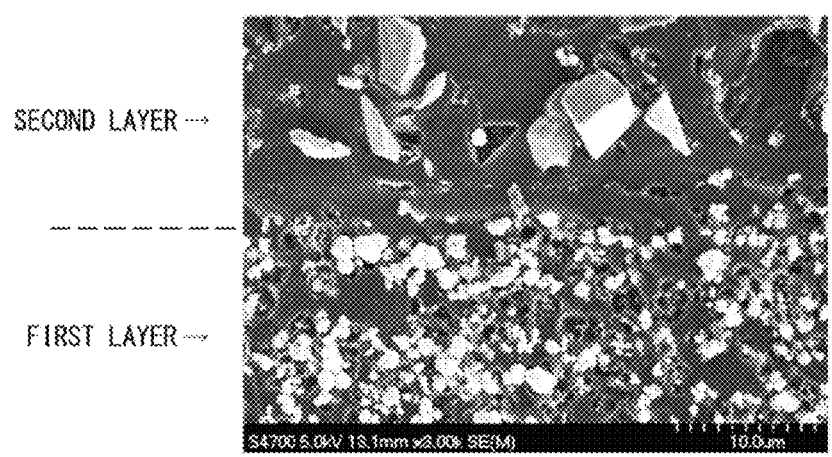

CARBON-BASED ACOUSTIC MATCHING LAYER AND METHOD FOR PRODUCING SAME

TECHNICAL FIELD

The present invention relates to an acoustic matching layer and a method for producing the same, and this acoustic matching layer is suitable as an acoustic member used in, for example, medical ultrasonic contact probes or industrial ultrasonic flaw detection probes.

BACKGROUND ART

In ultrasonic probes used as ultrasonic contact probes and ultrasonic flaw detection probes, acoustic impedance is an important factor for ensuring that the vibrations from a lead zirconate titanate (PZT) or other piezoelectric element are allowed to propagate efficiently or that vibrations are efficiently received from a subject. Therefore, materials are required in which the acoustic impedance thereof is roughly intermediate to that of the piezoelectric element and subject, and in recent years, configurations have been proposed that attempt to widen bandwidth and increase sensitivity of ultrasonic waves using multilayered acoustic matching layers.

In the case of laminating materials having different acoustic impedance, since an adhesive is typically used for this purpose, problems with respect to the acoustic impedance of the adhesive layer material, uniformity of coating thickness, delamination and working temperature are thought to occur.

In response to such problems, acoustic matching layers have been proposed that are obtained by laminating a plurality of layers having different acoustic impedance without using an adhesive. In this case, in addition to being able to prevent delamination and enhance mechanical strength, the issue is to reduce loss attributable to reflection of sound waves at boundary surfaces as much as possible.

In response to this issue, Patent Document 1 describes that, by composing a first layer 13a in the form of a porous body (paragraph 0052) and coating with a material of a second layer 13b after sintering the first layer as shown in FIG. 3 of Patent Document 1, a portion of the second layer enters micropores of the first layer, and by further sintering in this state, peel strength between the first layer 13a and the second layer 13b is enhanced by an anchoring effect (paragraphs 0060-0061).

Although the method according to this Patent Document 1 is able to enhance peel strength, a well-defined boundary is still present between each layer.

Patent Document 2 describes a carbon-based acoustic plate that can be used as an acoustic matching plate. Example 2 of Patent Document 2 describes that, by mixing a certain ratio of graphite particles into a furan resin serving as a carbon source of amorphous carbon as a skeleton, further incrementally mixing in polymethyl methacrylate particles, which are lost during the course of carbonization resulting in the formation of pores, into each layer in different ratios, and subjecting to heat treatment in a nitrogen atmosphere to carbonize the furan resin and eliminate the polymethyl methacrylate particles to form pores, a carbon-based porous body can be obtained in which acoustic impedance changes in the direction of thickness and boundaries between two adjacent layers are not present.

However, according to the technique described in Patent Document 2, since the same filler particles in the form of graphite particles are incorporated into all layers at the same ratio, and changes in acoustic impedance are realized due to differences in porosity, there are limitations on the amount of change in acoustic impedance in the direction of thickness. In addition, Patent Document 2 does not consider the issues of bending and/or delamination during the course of carbonization and pore formation.

PRIOR ART DOCUMENTS

Patent Documents

[Patent Document 1] WO 2012/144226A1
[Patent Document 2] JP 2013-236262A

SUMMARY OF THE INVENTION

Problems to be Solved by the Invention

An object of the present invention is to provide a carbon-based acoustic matching layer, which has adequate mechanical strength, inhibits loss at boundary surfaces between layers, and is able to increase the amount of change in acoustic impedance in the direction of thickness, and a method for producing that acoustic matching layer.

Means for Solving the Problems

The subject inventors conceived of the present invention as indicated below with respect to the aforementioned problems.

(A1) A carbon-based acoustic matching layer comprising a plurality of layers, in which acoustic impedances of the plurality of layers change incrementally in the direction of thickness; wherein each layer contains amorphous carbon obtained by carbonizing a carbon-containing resin, and filler particles uniformly dispersed in the amorphous carbon selected based on a desired value of acoustic impedance of each layer, the amorphous carbon in two adjacent layers is integrated and the boundary surface there between is eliminated as a result of the carbon-containing resin being simultaneously carbonized in the laminated state, and different filler particles are used in at least two layers.

(A2) The carbon-based acoustic matching layer described in (A1) above, wherein the filler particles are contained in each layer at a ratio such that the difference in coefficient of linear contraction due to carbonization between adjacent layers is less than 3%.

(A3) The carbon-based acoustic matching layer described in (A2) above, wherein the difference in coefficient of linear contraction between adjacent layers is less than 0.3%.

(A4) The carbon-based acoustic matching layer described in any one of (A1) to (A3) above, wherein the filler particles are particles selected from among graphite, metal compounds and ceramics, and the metal is tungsten, titanium, molybdenum, iron or aluminum.

(A5) A method for producing a carbon-based acoustic matching layer comprising a plurality of layers, in which acoustic impedances of the plurality of layers change incrementally in the direction of thickness, comprising:

dispersing filler particles selected based on a desired impedance value of each layer in a carbon-containing resin, laminating the carbon-containing resin having the filler particles dispersed therein, and heating the laminated carbon-containing resin having the filler particles dispersed therein and carbonizing the carbon-containing resin in a non-oxidizing atmosphere to integrate the amorphous carbon in two adjacent layers and eliminate the boundary surface there between; wherein, different filler particles are selected for at least two layers.

(A6) The method described in (A5) above, further comprising:

finding the relationship between the ratio of dispersed filler particles and the coefficient of linear contraction due to carbonization for each of the selected filler particles, and determining the ratio of filler particles dispersed in the carbon-containing layer for each layer based on the relationship found so that the difference in the coefficient of linear contraction due to carbonization between adjacent layers is less than 3%.

(A7) The method described in (A6) above, wherein the difference in coefficient of linear contraction between adjacent layers is less than 0.3%.

(A8) The method described in any of (A5) to (A7), wherein the filler particles are particles selected from among graphite, metal oxide and ceramic particles, and the metal is tungsten, titanium, molybdenum, iron or aluminum.

(B1) A carbon-based acoustic matching layer comprising a plurality of layers, in which acoustic impedances of the plurality of layers change incrementally in the direction of thickness; wherein, each layer of the plurality of layers contains amorphous carbon and filler particles dispersed in the amorphous carbon, the amorphous carbon of two adjacent layers is integrated, and the two adjacent layers contain filler particles mutually different in types and/or content ratios.

(B2) The carbon-based acoustic matching layer described in (B1) above, wherein the amorphous carbon is obtained by carbonizing a carbon-containing resin, and the amorphous carbon in the two adjacent layers is integrated by simultaneously carbonizing the carbon-containing resin in a laminated state.

(B3) The carbon-based acoustic matching layer described in (B2) above, wherein a difference in coefficient of linear contraction due to carbonization between adjacent layers is less than 3%.

(B4) The carbon-based acoustic matching layer described in any one of (B1) to (B3) above, wherein the filler particles are particles selected from the group consisting of graphite, metal compounds, ceramics and combinations thereof.

(B5) The carbon-based acoustic matching layer described in (B4) above, wherein the metal compound is selected from the group consisting of metal carbides, metal borides, metal oxides, metal nitrides and combinations thereof.

(B6) A method for producing a carbon-based acoustic matching layer comprising a plurality of layers, in which acoustic impedances of the plurality of layers change incrementally in the direction of thickness, comprising:

providing a laminate comprising a plurality of types of filler-containing resin composition layers, and heating the laminate in a non-oxidizing atmosphere to amorphously carbonize a carbon-containing resin in the filler-containing resin compositions;

wherein in the plurality of types of filler-containing resin compositions, filler particles of mutually different types and/or content ratios are dispersed in the carbon-containing resin.

(B7) The method described in (B6) above, wherein the difference in coefficient of linear contraction due to carbonization between a plurality of types of adjacent filler-containing resin composition layers is less than 3%.

(B8) The method described in (B6) or (B7) above, wherein the filler particles are particles selected from the group consisting of graphite, metal compounds, ceramics and combinations thereof.

(B9) The method described in (B8) above, wherein the metal compound is selected from the group consisting of metal carbides, metal borides, metal oxides, metal nitrides and combinations thereof.

Effects of the Invention

According to the carbon-based acoustic matching layer of the present invention, as a result of integrating the amorphous carbon of two adjacent layers, the carbon-based acoustic matching layer has adequate mechanical strength, inhibits loss at the boundary surface between layers, and increases the amount of change in acoustic impedance in the direction of thickness.

In particular, according to the carbon-based acoustic matching layer of the present invention, as a result of employing a configuration in which filler particles selected based on a desired acoustic impedance value are uniformly dispersed in the amorphous carbon of each layer, acoustic impedance can be adjusted to within the range of 3 MRayls to 18 MRayls, thereby making it possible to increase the amount of change in acoustic impedance in the direction of thickness.

Since the carbon-based acoustic matching layer of the present invention uses amorphous carbon for the matrix thereof, it demonstrates superior chemical resistance and heat resistance, while also having superior processability without causing the formation of burrs in the manner of metal materials. In addition, since the carbon-based acoustic matching layer of the present invention has a constant electrical conductivity, it can be used as a power supply or conductor for supplying electrical signals, and in that case, the required wiring is simplified.

According to the method of the present invention for producing a carbon-based acoustic matching layer, since carbon-containing resin contained in each layer is carbonized simultaneously in a laminated state, the boundary surfaces of two adjacent amorphous carbon layers can be eliminated. Moreover, according to the method of the present invention, by adjusting the incorporated amount of filler particles so as to minimize the difference in the coefficient of linear contraction due to carbonization between two adjacent layers, bending and delamination during the course of carbonization can be prevented and mechanical strength can be improved.

BRIEF DESCRIPTION OF THE DRAWINGS

FIG. 1 is a scanning electron micrograph (SEM) of a cross-section of an acoustic matching layer obtained in Example 1.

EMBODIMENTS FOR CARRYING OUT THE INVENTION

<<Carbon-Based Acoustic Matching Layer>>

The carbon-based acoustic matching layer of the present invention comprises a plurality of layers, in which acoustic impedances of the plurality of layers change incrementally in the direction of thickness. Here, in this carbon-based acoustic matching layer, each of the plurality of layers contains amorphous carbon and filler particles dispersed in the amorphous carbon, the amorphous carbon of two adjacent layers is integrated, and two adjacent layers contain filler particles of mutually different types and/or content ratios.

With respect to the present invention, "integration" of the amorphous carbon of two adjacent layers refers to a state in which the boundary surface of the amorphous carbon between the two adjacent layers is at least partially not observed, preferably not observed in a region of 40% or more, 50% or more, 60% or more, 70% or more, 80% or more or 90% or more, and more particularly, to a state in which it is not observed with a scanning electron microscope (SEM) at a magnification factor of 1000×.

The layers contained in the carbon-based acoustic matching layer of the present invention may be two layers or more or three layers or more, and may be 10 layers or less or 5 layers or less.

The carbon-based acoustic matching layer of the present invention can further have a metal plate, ceramic plate and/or glass plate joined to the carbon-based acoustic matching layer.

The carbon-based acoustic matching layer of the present invention can be produced by an arbitrary method, and can be produced according to the method of the present invention in particular.

For example, in the carbon-based acoustic matching layer of the present invention, the amorphous carbon is that obtained by carbonizing a carbon-containing resin, and the amorphous carbon of two adjacent layers is integrated by simultaneous carbonizing the carbon-containing resin in a laminated state. In this case, the difference in the coefficient of linear contraction due to carbonization between the adjacent layers is less than 3%, less than 2%, less than 1% or less than 0.3%.

In addition, in the carbon-based acoustic matching layer of the present invention, for example, the amorphous carbon of two adjacent layers is integrated by diffusion bonding. In addition, in this case, a metal plate, ceramic plate or glass plate may be joined to the carbon-based acoustic matching layer by diffusion bonding.

<Amorphous Carbon>

The amorphous carbon is obtained by carbonizing a carbon-containing resin. Examples of such carbon-containing resins include thermoplastic resins and curable resins, and more particularly, thermosetting resins, and specific examples thereof include furan resin, phenol resin and vinyl chloride resin.

<Filler Particles>

The filler particles are dispersed in the amorphous carbon, and more particularly, are uniformly dispersed in the amorphous carbon. The type and/or content ratio of the filler particles can be selected based on the desired value of acoustic impedance in each layer.

The filler particles are particles selected from the group consisting of graphite, metal compounds, ceramics and combinations thereof. The metal compound can be selected from the group consisting of metal carbides, metal borides, metal oxides, metal nitrides and combinations thereof, and the metal that composes the metal compound can be selected from the group consisting of tungsten, titanium, molybdenum, iron, aluminum and combinations thereof.

<<Method for Producing Carbon-Based Acoustic Matching Layer>>

The method for producing a carbon-based acoustic matching layer comprising a plurality of layers, in which acoustic impedances of the plurality of layers change incrementally in the direction of thickness comprises providing a laminate comprising a plurality of filler-containing resin composition layers and heating the laminate in a non-oxidizing atmosphere to amorphously carbonize the carbon-containing resin of the filler-containing resin composition. Here, in the plurality of filler-containing resin composition layers, filler particles of mutually different types and/or content ratios are dispersed in the carbon-containing resin.

According to the method of the present invention, the amorphous carbon of two adjacent layers can be integrated, and thereby the carbon-based acoustic matching layer of the present invention can be produced.

<Coefficient of Linear Contraction Due to Carbonization>

In the method of the present invention, the difference in the coefficient of linear contraction due to carbonization between a plurality of types of filler-containing resin composition layers is less than 3%, less than 2%, less than 1% or less than 0.3%. In this manner, cracking and bending of the laminate during carbonization can be inhibited by reducing the difference in coefficient of linear contraction due to carbonization.

The coefficient of contraction in the case of curing an object of a carbon-containing resin and filler particles dispersed therein and carbonizing by subjecting to heat treatment in a non-oxidizing atmosphere depends on the type and added amount of filler. Thus, by measuring the coefficient of linear contraction based on a pre-calcination value of 100% by dispersing, curing and carbonizing filler particles while changing the added amount for each filler used, the relationship between the added amount of filler particles and coefficient of linear contraction attributable to carbonization can be determined for each filler. By then adjusting the added amount of filler particles based on the resulting relationship, the coefficient of linear contraction can be adjusted so that the difference in coefficient of linear contraction between adjacent layers is less than a desired value.

Furthermore, descriptions relating to the carbon-based acoustic matching layer of the present invention can be referred to with respect to the carbon-containing resin, filler particles and so forth able to be used in the method of the present invention.

EXAMPLES

In the following descriptions of the examples, the term "part(s)" as related to the ratio of a component in a composition refers to "parts by mass".

Example 1

One part of p-toluenesulfonic acid as a curing agent was added to 30 parts of furan resin (VF-303, Hitachi Chemical Co., Ltd.) as an amorphous carbon source and 70 parts of tungsten carbide (NCWC10, Nikkoshi Co., Ltd., particle size: 1.2 µm) as filler particles, followed by adequately stirring using a high-speed emulsifier/disperser (Model 2.5 Homomixer Mark II, Primix Corp.) and subjecting to a vacuum degassing procedure to prepare a solution for a sheet-like first layer. This solution was poured into a mold having a thickness of 0.7 mm and then cured to obtain a first layer.

Then, a second layer was laminated onto the resulting sheet-like first layer. More specifically, 1 part of p-toluenesulfonic acid was added to 50 parts of furan resin and 50 parts of titanium carbide (Japan New Metals Co., Ltd., particle size: 1.9 µm) followed by adequately stirring and subjecting to a vacuum degassing procedure to prepare a solution for the second layer. This solution was poured into a mold having a thickness of 0.7 mm on a sheet molded as the first layer and then cured to obtain a second layer, thereby obtaining a laminate having a thickness of 1.4 mm.

This laminate was dried for 3 hours at 180° C. and then treated for 3 hours at 1000° C. in nitrogen gas to obtain a flat, integrated carbon-based matching layer having a thickness of 1.2 mm.

Example 2

One part of p-toluenesulfonic acid as a curing agent was added to 30 parts of a phenol resin (HP3000A, Asahi Yukizai Corp.) and 70 parts of tungsten carbide, followed by adequately stirring and subjecting to a vacuum degassing procedure to prepare a solution for a sheet-like first layer. This solution was coated at a thickness of 30 μm using the No. 542-AB Automatic Film Applicator (Yasuki Seiki Seisakusho, Ltd.) and then cured to obtain a sheet-like first layer.

Then, a second layer was laminated onto the resulting sheet-like first layer. More specifically, 1 part of p-toluenesulfonic acid was added to 40 parts of furan resin and 60 parts of double carbide (tungsten/titanium carbide) (WC-TiC50/50, Japan New Metals Co., Ltd., particle size: 1.0 μm) followed by adequately stirring and subjecting to a vacuum degassing procedure to prepare a solution for the second layer. This solution was coated to a thickness of 30 μm on a sheet molded as the first layer and then cured to obtain a second layer.

Further, a third sheet was laminated on the resulting sheet-like laminate comprising the first layer and second layer. More specifically, 1 part of p-toluenesulfonic acid was added to 50 parts of furan resin and 50 parts of titanium carbide followed by adequately stirring and subjecting to a vacuum degassing procedure to prepare a solution for the third layer. This solution was coated to a thickness of 30 μm on the second layer and then cured to obtain a laminate having a thickness of 90 μm.

This laminate was dried for 3 hours at 180° C. and then treated for 3 hours at 1000° C. in nitrogen gas to obtain a flat, integrated carbon-based matching layer having a thickness of 75 μm.

Example 3

One part of p-toluenesulfonic acid as a curing agent was added to 50 parts of furan resin and 50 parts of tungsten carbide, followed by adequately stirring and subjecting to a vacuum degassing procedure to prepare a solution for a first layer. This solution was coated at a thickness of 30 μm and then cured to obtain a sheet-like first layer.

Then, a second layer was laminated onto the resulting sheet-like first layer. More specifically, 1 part of p-toluenesulfonic acid was added to 70 parts of furan resin and 30 parts of titanium oxide (KA-15, Titan Kogyo Ltd., mean particle diameter: 0.5 μm) followed by adequately stirring and subjecting to a vacuum degassing procedure to prepare a solution for the second layer. This solution was coated to a thickness of 30 μm on a sheet molded as the first layer and then cured to obtain a second layer.

Further, a third sheet was laminated on the resulting sheet-like laminate comprising the first layer and second layer. More specifically, 1 part of p-toluenesulfonic acid was added to 90 parts of furan resin and 10 parts of graphite (flake graphite, Nippon Graphite Industries, Ltd., mean particle diameter: 5 μm), followed by adequately stirring and subjecting to a vacuum degassing procedure to prepare a solution for the third layer. This solution was coated to a thickness of 30 μm on the second layer and then cured to obtain a laminate having a thickness of 90 μm.

This laminate was dried for 3 hours at 180° C. and then treated over the course of 3 hours at 1000° C. in nitrogen gas to obtain a flat, integrated carbon-based matching layer having a thickness of 75 μm.

Example 4

One part of p-toluenesulfonic acid as a curing agent was added to 30 parts of furan resin and 70 parts of tungsten carbide, followed by adequately stirring and subjecting to a vacuum degassing procedure to prepare a solution for a first layer. This solution was poured into a mold having a thickness of 0.7 mm and then cured to obtain a sheet-like first layer.

Then, a second layer was laminated onto the resulting sheet-like first layer. More specifically, 1 part of p-toluenesulfonic acid was added to 80 parts of furan resin and 20 parts of tungsten carbide, followed by adequately stirring and subjecting to a vacuum degassing procedure to prepare a solution for the second layer. This solution was poured into a mold having a thickness of 0.7 mm on a sheet molded as the first layer and then cured to obtain a second layer, thereby obtaining a laminate having a thickness of 1.4 mm.

This laminate was dried for 3 hours at 180° C. and then treated for 3 hours at 1000° C. in nitrogen gas to obtain an integrated carbon-based matching layer. However, this carbon-based matching layer was partially cracked during calcination due to differences in the coefficient of contraction in each layer.

Example 5

One part of p-toluenesulfonic acid as a curing agent was added to 30 parts of furan resin and 70 parts of tungsten carbide, followed by adequately stirring to obtain a solution for a first layer. This solution was coated at a thickness of 30 μm using the No. 542-AB Automatic Film Applicator (Yasuki Seiki Seisakusho, Ltd.) and then cured to obtain a sheet-like first layer.

Then, a second layer was laminated onto the resulting sheet-like first layer. More specifically, 1 part of p-toluenesulfonic acid was added to 80 parts of furan resin and 20 parts of tungsten carbide followed by adequately stirring to prepare a solution for the second layer. This solution was coated to a thickness of 30 μm on the first layer and then cured to obtain a second layer, thereby obtaining a laminate having a thickness of 60 μm.

This laminate was dried for 3 hours at 180° C. and then treated for 3 hours at 1000° C. in nitrogen gas to obtain an integrated carbon-based matching layer having a thickness of 50 μm. However, this carbon-based matching layer was distorted considerably during calcination due to differences in the coefficient of contraction.

<Evaluation>

In addition, dispersion, curing and carbonization were individually carried out on the filler particles of each layer under the same conditions as Examples 1 to 5 followed by measuring the coefficient of linear contraction, density and speed of sound for each layer, and calculating acoustic impedance values by multiplying density by speed of sound. Speed of sound was measured according to the water immersion method using an ultrasonic probe. The results are shown in Table 1 along with the forms of the carbon-based matching layers obtained in Examples 1 to 5.

TABLE 1

| | | Filler Particles | Coefficient of Linear Contraction (%) | Density (g/cm³) | Speed of Sound (m/s) | Acoustic Impedance (MRayl) | Post-calcined Form |
|---|---|---|---|---|---|---|---|
| Example 1 | 1st layer | Tungsten carbide | 83.70 | 4.9 | 2770 | 13.6 | Good (flat plate) |
| | 2nd layer | Titanium carbide | 83.90 | 2.6 | 3190 | 8.3 | |
| Example 2 | 1st layer | Tungsten carbide | 83.70 | 4.9 | 2770 | 13.6 | Good (flat sheet) |
| | 2nd layer | Double carbide | 83.70 | 3.4 | 3293 | 11.2 | |
| | 3rd layer | Titanium carbide | 83.90 | 2.6 | 3190 | 8.3 | |
| Example 3 | 1st layer | Tungsten carbide | 80.20 | 3.4 | 3080 | 10.5 | Good (flat sheet) |
| | 2nd layer | Titanium oxide | 80.30 | 2 | 4490 | 9 | |
| | 3rd layer | Graphite | 80.40 | 1.6 | 3980 | 6.4 | |
| Example 4 | 1st layer | Tungsten carbide | 83.70 | 4.9 | 2770 | 13.6 | Bad (cracked) |
| | 2nd layer | Tungsten carbide | 78.00 | 2 | 4040 | 8.1 | |
| Example 5 | 1st layer | Tungsten carbide | 83.70 | 4.9 | 2770 | 13.6 | Bad (considerable distortion) |
| | 2nd layer | Tungsten carbide | 87.00 | 2 | 4040 | 8.1 | |

As is clear from Table 1, the difference in coefficient of linear contraction between each layer in Examples 1 to 3, in which a flat plate (thickness: 1.2 mm) or flat sheet (thickness: 75 μm) was obtained in which acoustic impedance changes incrementally in the direction of thickness, being less than 0.3%. On the contrary, the difference in coefficient of linear contraction between each layer in Examples 4 and 5, in which cracking or bending occurred during calcination, exceeded 3%. Proper selection of the filler particles makes it possible to obtain an acoustic matching layer in which the value of acoustic impedance changes incrementally in the direction of thickness from 3 MRayls to 18 MRayls.

FIG. 1 shows a cross-sectional micrograph of the acoustic matching layer obtained in Example 1. It can be confirmed from FIG. 1 that the matrix in the form of amorphous carbon is integrated into the first layer and second layer.

The invention claimed is:

1. A carbon-based acoustic matching layer comprising a plurality of layers, in which acoustic impedances of the plurality of layers change incrementally in the direction of thickness; wherein,
   each layer of the plurality of layers contains amorphous carbon as a matrix and filler particles dispersed in the amorphous carbon,
   the amorphous carbon of two adjacent layers of the plurality of layers containing amorphous carbon is integrated, and
   the two adjacent layers contain filler particles mutually different in types and/or content ratios.

2. The carbon-based acoustic matching layer according to claim 1, wherein
   the amorphous carbon is obtained by carbonizing a carbon-containing resin, and
   the amorphous carbon in the two adjacent layers is integrated by simultaneously carbonizing the carbon-containing resin in a laminated state.

3. The carbon-based acoustic matching layer according to claim 2, wherein a difference in coefficient of linear contraction due to carbonization between adjacent layers is less than 3%.

4. The carbon-based acoustic matching layer according to claim 1, wherein the filler particles are particles selected from the group consisting of graphite, metal compounds, ceramics and combinations thereof.

5. The carbon-based acoustic matching layer according to claim 4, wherein the metal compound is selected from the group consisting of metal carbides, metal borides, metal oxides, metal nitrides and combinations thereof.

6. A method for producing a carbon-based acoustic matching layer comprising a plurality of layers, in which acoustic impedances of the plurality of layers change incrementally in the direction of thickness, comprising:
   providing a laminate comprising a plurality of types of filler-containing resin composition layers, and
   heating the laminate in a non-oxidizing atmosphere to amorphously carbonize a carbon-containing resin in the filler-containing resin compositions;
   wherein in the plurality of types of filler-containing resin compositions, filler particles of mutually different types and/or content ratios are dispersed in the carbon-containing resin.

7. The method according to claim 6, wherein the difference in coefficient of linear contraction due to carbonization between a plurality of types of adjacent filler-containing resin composition layers is less than 3%.

8. The method according to claim 6, wherein the filler particles are particles selected from the group consisting of graphite, metal compounds, ceramics and combinations thereof.

9. The method according to claim 8, wherein the metal compound is selected from the group consisting of metal carbides, metal borides, metal oxides, metal nitrides and combinations thereof.

10. The carbon-based acoustic matching layer according to claim 2, wherein the amorphous carbon of two adjacent layers of the plurality of layers containing amorphous carbon is integrated in a state in which the boundary surface of the amorphous carbon between the two adjacent layers is at least partially not observed.

11. The carbon-based acoustic matching layer according to claim 10, wherein the boundary surface of the amorphous carbon between the two adjacent layers is not observed in a region of 40% or more.

* * * * *